(12) United States Patent
Monga et al.

(10) Patent No.: US 8,462,389 B2
(45) Date of Patent: Jun. 11, 2013

(54) HALFTONE-INDEPENDENT SCANNER PROFILING

(75) Inventors: Vishal Monga, Webster, NY (US);
Shen-Ge Wang, Fairport, NY (US);
Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 937 days.

(21) Appl. No.: 12/405,737

(22) Filed: Mar. 17, 2009

(65) Prior Publication Data

US 2010/0238508 A1    Sep. 23, 2010

(51) Int. Cl.
*H04N 1/405* (2006.01)

(52) U.S. Cl.
USPC .............................. 358/3.06; 358/504; 347/43

(58) Field of Classification Search
None
See application file for complete search history.

(56) References Cited

U.S. PATENT DOCUMENTS

| | | |
|---|---|---|
| 5,469,267 A | 11/1995 | Wang |
| 5,748,330 A | 5/1998 | Wang et al. |
| 5,854,882 A | 12/1998 | Wang |
| 6,266,157 B1 | 7/2001 | Fan et al. |
| 6,435,654 B1 * | 8/2002 | Wang et al. ..................... 347/43 |
| 6,650,438 B1 * | 11/2003 | Kress et al. ..................... 358/1.9 |
| 7,724,406 B2 | 5/2010 | Wang et al. |

OTHER PUBLICATIONS

R. Bala, "Device Characterization", *Digital Color Imaging Handbook*, Chapter 5. CRC Press, 2003.
J.A.C. Yule, W.J. Nielsen, "The penetration of light into paper and its effect on halftone reproduction", *Proc. TAGA*, pp. 65-76, 1951.
Wang, Shen-ge, "Two-by-Two Centering Printer Model with Yule-Nielsen Equation", IS&T's NIP 14, International Conference on Digital Printing Technologies, Oct. 1998; p. 302-305; ISBN / ISSN: 0-89208-212-7.

* cited by examiner

*Primary Examiner* — Twyler Haskins
*Assistant Examiner* — Christopher D Wait
(74) *Attorney, Agent, or Firm* — Fay Sharpe LLP

(57) ABSTRACT

A method and system is disclosed for characterizing a color scanner comprising generating a halftone-independent target of color patches, printing the target on a color hardcopy device, measuring the target to obtain device-independent color values, scanning the target to obtain scanner color values, and building a scanner profile that relates scanned color values to device-independent color values.

16 Claims, 5 Drawing Sheets

HALFTONE-INDEPENDENT SCANNER PROFILING

TECHNICAL FIELD

The presently disclosed embodiments are directed to color printing and display systems; and especially color characterization of such systems.

BACKGROUND

In today's business and scientific world, color has become essential as a component of communication. Color facilitates the sharing of knowledge and ideas. Companies involved in the development of digital color imaging systems are continuously looking for ways to improve the total image quality of their products. One of the elements that affects image quality is the ability to consistently produce the same quality image output on a printer from one day to another, from one week to the next, month after month.

Another element is the ability to accurately capture colors on an image acquisition device such as a scanner or digital camera. In particular, color scanners are an essential component in the digitization of color hardcopy documents. High-quality color scanning requires that the scanners are accurately characterized with respect to standard measurable descriptions of color. Furthermore, since color scanners are commonly available in many imaging environments, they can be used to measure color for printer calibration, characterization and/or diagnostics purposes. Again this requires accurate color characterization of the scanner.

Standard approaches for scanner color characterization are carried out as follows [REFERENCE: Raja Bala, "Device Characterization", Chapter 5 of *Digital Color Imaging Handbook*, Gaurav Sharma Ed., CRC Press, 2003]. First a target comprising color patches is printed and scanned. The target is simultaneously measured with a color measurement device to obtain spectral reflectance or calorimetric measurements such as CIELAB for each of the printed patches. Scanner characterization is the process of relating the scanned device-dependent (usually RGB) signals to the spectral or calorimetric device-independent representation using the target patch data. The scanner characterization can be implemented either with a series of analytic functions (e.g. matrices, polynomial, etc) or with 1-dimensional and/or multidimensional lookup tables (LUTs). These functions or LUTs are stored in a scanner profile.

It is well known that the scanner characterization is very closely tied to the hardcopy medium and colorants being scanned. This means the scanner characterization process must generally be repeated for each input medium (i.e. combination of substrate, colorants, and image path elements). Thus, for example, different scanner color characterization profiles are required for use in scanning prints made with a photographic versus electrophotographic versus inkjet printing system. The primary reason for this is that color scanners are, in general, not calorimetric, so that the relationship between the response of the scanner and that of the human eye changes in a nonlinear fashion depending on the spectral properties of the medium being scanned. This property is referred to as scanner metamerism.

Many output devices render color via a halftoning process, which prints dot patterns on the medium. In addition to the aforementioned dependence of the scanner characterization on media and colorant properties, it turns out that the scanner color response can also be a strong function of the characteristics of the halftone used to generate the color prints. This means that if the halftoning method used to create the scanner characterization target is different from the halftoning method used to produce the hardcopy images that are ultimately scanned; this can produce undesirable errors in the scanner color correction process. Said differently, if the scanner profile is trained on one halftone, it may produce unacceptable errors when scanning prints made with a different halftone. The characteristics of the halftone that the scanner characterization is particularly sensitive to are screen frequency and dot growth and overlap characteristics (e.g. clustered vs. dispersed or stochastic). This phenomenon is referred to herein as halftone metamerism. As such, it limits the accuracy of the scanner to predict color from a hardcopy printed using a halftoning method different from the one that was used to derive the scanner profile.

Thus, there is a need for a scanner characterization technique that is "halftone-independent", or equivalently robust across a wide variety of halftones, thus overcoming the halftone metamerism problem. Clearly, using a target that comprises some finite set of halftoning schemes is somewhat impractical due to the vast variety of halftoning methods that can be employed. The alternative strategy of supporting different scanner profiles for different halftones now places a burden on the user to correctly associate the correct halftone with the correct profiles. To mitigate these problems, the use of a single halftone-independent target for scanner characterization is proposed.

DETAILED DESCRIPTION

The subject embodiments comprise using a halftone-independent target for building scanner profiles. As noted above, the accuracy of a scanner profile in predicting color from a hard copy can be compromised if the halftoning method used in generating the hard copy differs significantly from the one that was used to generate the characterization target upon which the scanner profile is derived. Scanners exhibit halftone metarmerism in addition to a well known dependence on the media and colorants being scanned. The halftone metamerism problem can be overcome by the use of a single halftone-independent target for scanner characterization.

Several techniques can be conceived for designing a halftone-independent scanner characterization target. One embodiment includes using a target based on the 2×2 binary printer model by Wang et al. which is described, for example, in the following U.S. patents, all of which are hereby expressly incorporated by reference into the specification:

U.S. Pat. No. 5,469,267, U.S. Pat. No. 5,748,330, U.S. Pat. No. 5,854,882, U.S. Pat. No. 6,266,157 and U.S. Pat. No. 6,435,654. The 2×2 printer model is also described in the following document that is also hereby expressly incorporated by reference into this specification: S. Wang, "Two-by-Two Centering Printer Model with Yule-Nielsen Equation," Proc. IS&T NIP14, 1998.

Figure 2A:
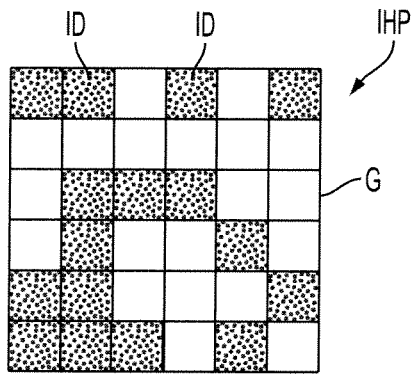
FIG. 2A illustrates an ideal non-overlapping printer model for halftone patterns.
Figure 2B:
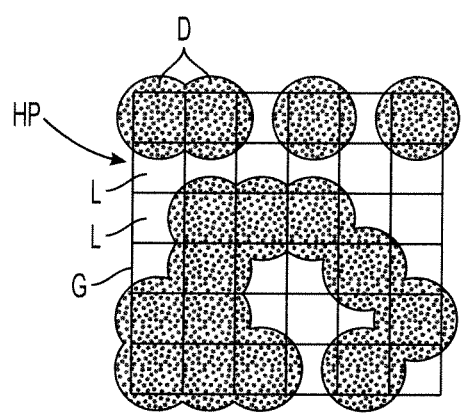
FIG. 2B illustrates a conventional overlapping circular dot printer model for halftone patterns.
Figure 2C:
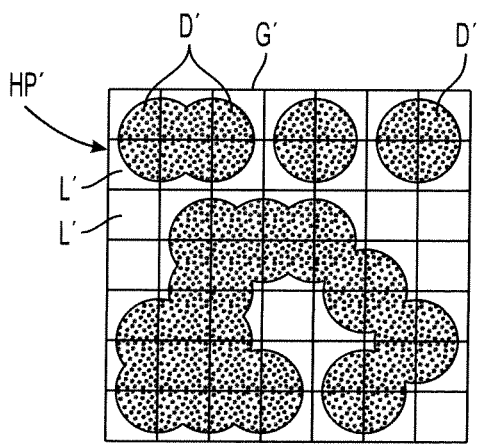
FIG. 2C illustrates a 2×2 printer model for halftone patterns.

The 2×2 printer model is explained briefly for a monochrome printer with reference to FIGS. 2A, 2B and 2C (note that in FIGS. 2A, 2B, 2C the grid pattern is shown for reference only). FIG. 2A illustrates an ideal example of a halftone printer output pattern independent half-tone pattern (IHP), where none of the ink/toner dots ID overlap each other (any halftone pattern can be used and the one shown is a single example only); practical printers are incapable of generating non-overlapping square dots as shown in FIG. 2A. A more realistic dot overlap model is the circular dot model shown in FIG. 2B for the pattern HP (the halftone pattern HP of FIG. 2B corresponds to the halftone pattern IHP of FIG. 2A). These overlapping dots D in combination with optical scattering in the paper medium create many difficulties in modeling a black-and-white printer (or a monochromatic channel of a color printer). In a conventional approach such as shown in FIG. 2B, the output pixel locations are defined by the rectangular spaces L of the conceptual grid pattern G and are deemed to have centers coincident with the centers of the dots output D (or not output) by the printer. Because the grid G is conceptual only, according to the 2×2 printer model, the grid G can be shifted as shown in FIG. 2C and indicated at G' so that the printer output dots D' of the pattern HP' are centered at a cross-point of the grid G' rather than in the spaces L'. Although the halftone dot patterns HP,HP' of FIGS. 2B and 2C are identical, overlapping details within the rectangular spaces L' of the grid of FIG. 2C are completely different as compared to FIG. 2B. More particularly, there are only $2^4=16$ different overlapping dot patterns for the 2×2 model shown in FIG. 2C, while there are $2^9=512$ different overlapping dot patterns in a conventional circular dot model as shown in FIG. 2B.

Figure 2D:
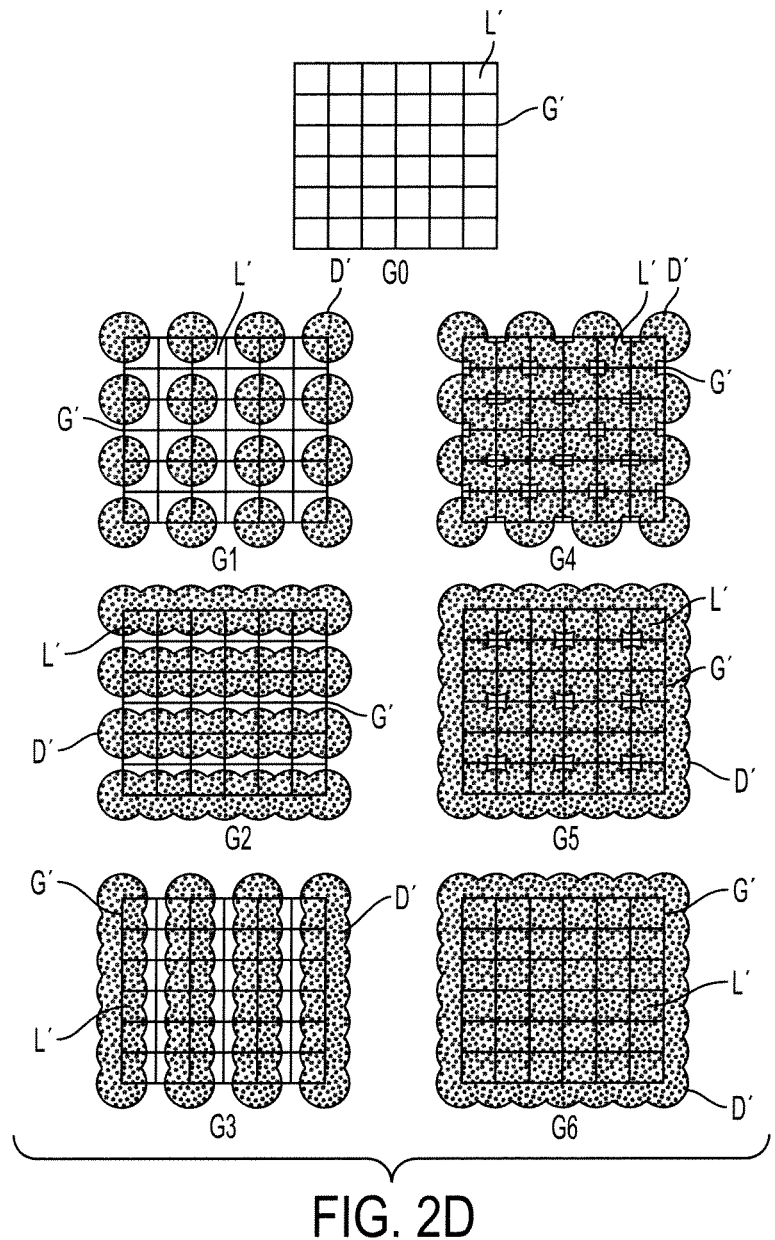
FIG. 2D illustrates seven 2×2 patterns that account for all of the sixteen possible overlapping printer output dots in the 2×2 printer model.

The sixteen different overlapping dot patterns of FIG. 2C can be grouped into seven categories G0-G6 as shown in FIG. 2D, i.e., each of the 16 possible different overlapping dot patterns of a pixel location L' associated with the model of FIG. 2C can be represented by one of the seven patterns G0-G6 of FIG. 2D. The patterns G0 and G6 represent solid white and solid black (or other monochrome color), respectively. The pattern G1 is one of four different equivalent overlapping patterns that are mirror image of each other, as is the pattern G5. Each of the patterns G2, G3, G4 represents one of two different mirror-image overlapping patterns. Therefore, in terms of ink/toner color coverage (gray level), all pixels (located in the rectangular spaces L' of the conceptual grid pattern G) of each of the seven patterns G0-G6 are identical within a particular pattern G0-G6. In other words, each pattern G0-G6 consists of only one gray level at the pixel level L', and this gray level can be measured exactly.

Figure 2E:
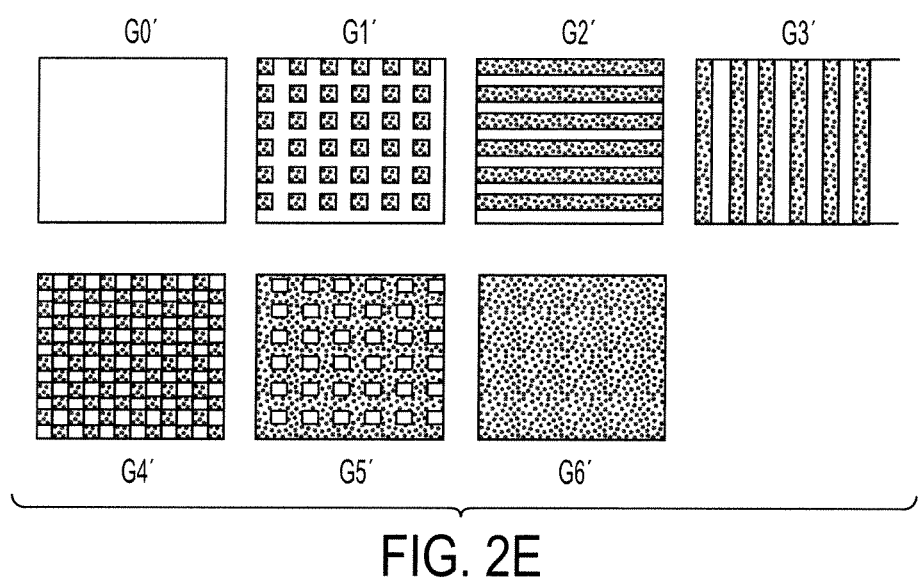
FIG. 2E illustrates one example of real-world representations or "test patches" for the seven 2×2 patterns of FIG. 2D.

The test patches G0'-G6' shown in FIG. 2E illustrate an example of one possible real-world embodiment for printing the seven patterns G0-G6. The present development is described herein with reference to printing and measuring the color of the test patches G0'-G6', and those of ordinary skill in the art will recognize that this is intended to encompass printing and measuring the color of any other test patches that respectively represent the patterns G0-G6 in order to satisfy the 2×2 printer model as described herein. It is not intended that the present development, as disclosed below, be limited to use of the particular test patches G0'-G6' or any other embodiment of the 2×2 patterns G0-G6. In general, for the 2×2 printer model to hold, the shape of the dots D' must be symmetric in the x (width) and y (height) directions, and each dot D' should be no larger than the size of two output pixel locations L' in both the x and y directions. The dots D' need not be circular as shown.

Figure 3:
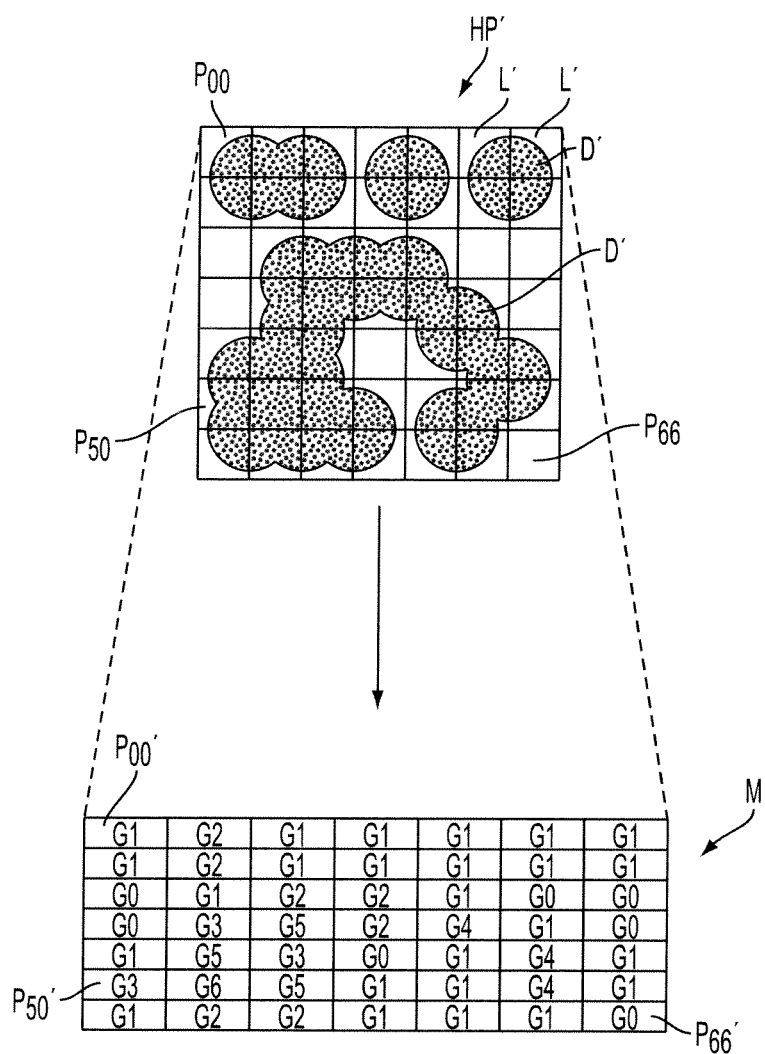
FIG. 3 illustrates an example of modeling a binary (halftone) pattern using a select plurality of the seven 2×2 patterns of FIG. 2D.

The 2×2 printer model as just described can be used to predict the gray level of any binary (halftone) pattern, because any binary pattern such as the halftone pattern of FIG. 2C can be modeled as a combination of the seven patterns G0-G6, each of which has a measurable gray level as just described. In other words, once the seven test patches G0'-G6' are printed and the gray (color) level of each is measured, the gray level of any binary pattern can be predicted mathematically and without any additional color measurements. For example, the halftone pattern of FIG. 2C is shown in FIG. 3, along with its corresponding 2×2 based model M, wherein each of the output pixels of the halftone pattern HP' (conceptually located in a rectangular space L' of the grid) is represented by one of the seven 2×2 patterns G0-G6 that has a corresponding color output pattern/coverage for its pixels. Thus, for example, for the pixel $P_{00}$ of the binary pattern HP', the 2×2 pattern G1 has pixels with corresponding color coverage (as indicated at $P_{00}'$, while for the pixel $P_{50}$, the 2×2 pattern G3 has pixels with corresponding color coverage as shown at $P_{50}'$, and for the pixel $P_{66}$ there is no color which corresponds to the pattern G0 as indicated at $P_{66}'$ of the model M. As such, any binary pattern of pixels can be modeled as a combination of the 2×2 patterns G0-G6 by selecting, for each pixel of the binary pattern, the one of the 2×2 patterns G0-G6 that is defined by pixels having color coverage the equals the color coverage of the pixel in question.

When a binary pattern HP' is represented by a model M comprising a plurality of the patterns G0-G6, the gray level output of the binary pattern HP' can be estimated mathematically, e.g., using the Neugebauer equation with the Yule-Nielsen modification, as follows:

$$G_{AVG}^{1/\gamma} = \sum_{i=0}^{6} n_i G_i^{1/\gamma} \quad (1)$$

where $G_i$, i=0 to 6 is the measured gray level of the respective 2×2 patterns G0-G6, $n_i$ is the number of pixels of the corresponding 2×2 pattern in the binary pattern, and y is the Yule-Nielsen factor, a parameter which is often chosen to optimize the fit of the model to selected measurements of halftone patches. Details of such an optimization are given in R. Bala, "Device Characterization," Digital Color Imaging Handbook, Chapter 5, CRC Press, 2003. For example, the average gray level of the binary pattern of FIG. 2B/FIG. 2C can be estimated as:

$$G_{AVG}=(7G_0^{1/\gamma}+25G1^{1/\gamma}+7G_2^{1/\gamma}+3G_3^{1/\gamma}+3G_4^{1/\gamma}+3G_5^{1/\gamma}+G_6^{1/\gamma})^\gamma \quad (2)$$

The aforementioned 2×2 printer model can be extended in a straightforward fashion to the case of color halftone patterns. The color 2×2 printer model can predict the color appearance of binary patterns for a given color printer and the color accuracy of the prediction is high for printers with relatively uniform dot shapes, such as inkjet printers.

The 2×2 printer model predicts output color at the pixel level. To estimate the average color of a large area by a binary color printer, one may use modified Neugebauer equations. For the following discussion, colors are specified in spectral reflectance, though they could be in tristimulus values XYZ or another appropriate space as well. The predicted color reflectance R(λ) of an output by a binary printer (accounting for light scattering in the paper) is given by $$R(\lambda)^{1/n} = \sum_{i=1}^{n} a_i R_i(\lambda)^{1/n} \quad (3)$$

where $a_i$ and $R_i(\lambda)$ are the area coverage and the spectral-reflectance of each primary color, N is the total number of primary colors, and n is the Yule-Nielsen factor.

The difficulty in applications of Neugebauer equations with conventional printer models is to accurately estimate the area coverage of primaries, mainly due to the complexity of dot overlapping. However, this difficulty is completely eliminated by the 2×2 printer model. The modified Neugebauer equation, shown by Equation (2), can be directly applied to the 2×2 printer model for predicting average colors of any dot combinations. As the case stands, $R_i(\lambda)$ in Equation (3) represents the measured spectral reflectance of each 2×2 color. The area coverage $a_i$ of each 2×2 color is directly proportional to its occurrence $m_i$ in number of pixels, and can be calculated by the following equation $$a_i = m_i \bigg/ \sum_{j=1}^{N} m_j \quad (4)$$

Figure 1:
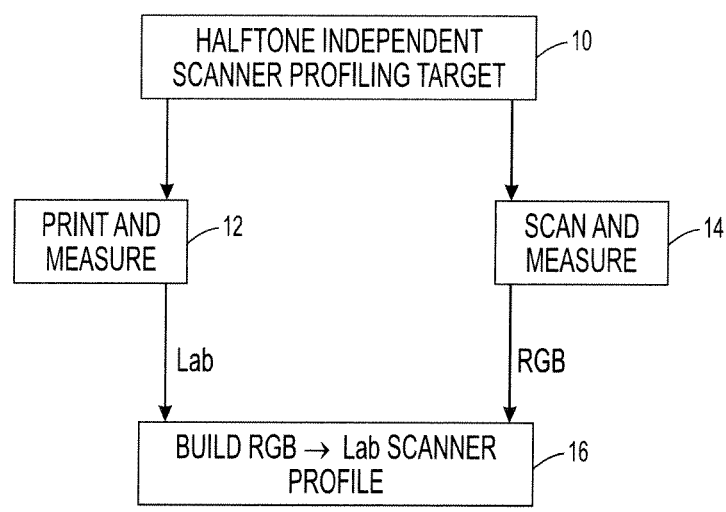
FIG. 1 graphically illustrates a method/block diagram for building a scanner profile using a halftone-independent target.

FIG. 1 shows a schematic for scanner characterization wherein the characterization target is halftone-independent, i.e., dot patterns derived from binary patterns that are not tied to any single halftoning method. The halftone-independent scanner profiling target 10 is printed and measured 12 with a printing device to obtain device-independent color values and also scanned and measured in an RGB scanner 14 (or other image capture devices) to obtain device-dependent color values. In one embodiment, cyan, magenta and yellow (CMY) colorants are printed, and the halftone-independent target comprises 1,072 patches based on the 2×2 binary printer model. The device-independent color values are related to the device-dependent color values for generating a profile characterizing the scanner. The relating includes generating a multidimensional LUT corresponding measured device-independent color values to captured device-dependent color values. The target set may be printed at a plurality of spatial resolutions on the printer. Deriving 16 the scanner profile is achieved by using conventional scanner calibration software and replacing the existing contone CMY(K) target with the halftone-independent target of fundamental binary patterns 10. All subsequent processing, for example, averaging of color patches, then proceeds as in a current scanner characterization routine, as described in the reference by Raja Bala, "Device Characterization", Chapter 5 of *Digital Color Imaging Handbook*, Gaurav Sharma Ed., CRC Press, 2003

The subject embodiments intend to also cover fundamental binary patterns other than the 2×2 patterns referenced above. Any canonical set of binary patterns may be used as long as they are sufficient to characterize the dot overlaps corresponding to the halftone outputs of interest. One practical example is to use a subset of the complete 2×2 target, which can be achieved by analyzing the color distribution of the full set and eliminating some of the redundant representations.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A halftone-independent method for characterizing a color scanner operatively associated with a printer:
   printing a target set of basic patches on the printer, the target set of basic patches including binary patterns that characterize dot overlaps associated with all possible halftone patterns associated with the printer, wherein the basic patches are generated with dot patterns derived from the binary patterns and the dot patterns represent various dot patterns included in the plurality of halftone patterns associated with the printer;
   measuring the target set of basic patches to obtain device-independent color values;
   scanning the target set of basic patches with the color scanner and obtaining scanner color values; and,
   relating the scanner color values to the device-independent color values for generating a scanner profile characterizing the color scanner.

2. The method of claim 1 wherein printing the target set comprises printing binary 2×2 spatial dot arrangements.

3. The method of claim 1 wherein relating includes generating a multidimensional lookup table corresponding measured device-independent color values to scanner color values.

4. The method of claim 1 wherein the device-independent color values are CIELAB values, and scanner values are RGB values.

5. The method of claim 2 further including generating the target set as a target of less than 1,072 patches based on a 2×2 binary printer model.

6. The method of claim 1 wherein the target set is printed with cyan, magenta, yellow and black colorants.

7. A system for building a color profile for a scanner operatively associated with a printer, including:
   a halftone-independent scanner profiling target set comprising a plurality of patches, the target set including binary patterns that form a basis set for a plurality of halftone methods associated with the printer, the binary patterns characterizing dot overlaps associated with all possible halftone patterns associated with the printer;
   at least one print of the profiling target set generated on the printer;
   a plurality of device-independent color values measured from the at least one print;
   a corresponding plurality of scanner color value generated by the scanner from the at least one print; and,
   a relational database relating the plurality of measured device-independent color values to corresponding ones of the plurality of scanner color values.

8. The system of claim 7 wherein the target set comprises binary 2×2 spatial dot arrangements.

9. The system of claim 8 wherein the target set is less than 1,072 color patches based on a 2×2 binary printer model.

10. The system of claim 7 wherein the relational data base comprises a multidimensional lookup table.

11. The system of claim 7 wherein the device-independent color values are CIELAB values, and scanner values are RGB values.

12. The system of claim 7 wherein the target set is printed with cyan, magenta, yellow and black colorants.

13. A method for characterizing an image capture device for capturing a printed image comprising:
- printing a target set of patches on a printer associated with the image capture device, the target set including binary patterns that form a basis set for a plurality of halftone methods associated with the printer and, the patches are generated with dot patterns that are independent of the halftone method, the binary patterns characterizing dot overlaps associated with all possible halftone patterns associated with the printer;
- measuring the printed target set to obtain device-independent color values;
- capturing the printed target set with the image capture device to obtain device-dependent color values; and,
- relating the device-independent color values to the device-dependent color values for generating a profile characterizing the image capture device.

14. The method of claim 13 wherein printing and measuring are performed a priori in an offline step.

15. The method of claim 13 wherein printing the target set comprises printing binary 2×2 spatial dot arrangements.

16. The method of claim 13 wherein relating includes generating a multidimensional lookup table corresponding measured device-independent color values to captured device-dependent color values.

* * * * *